D. W. KELLOGG.
Traction or Portable-Engines.
No. 135,128. Patented Jan. 21, 1873.
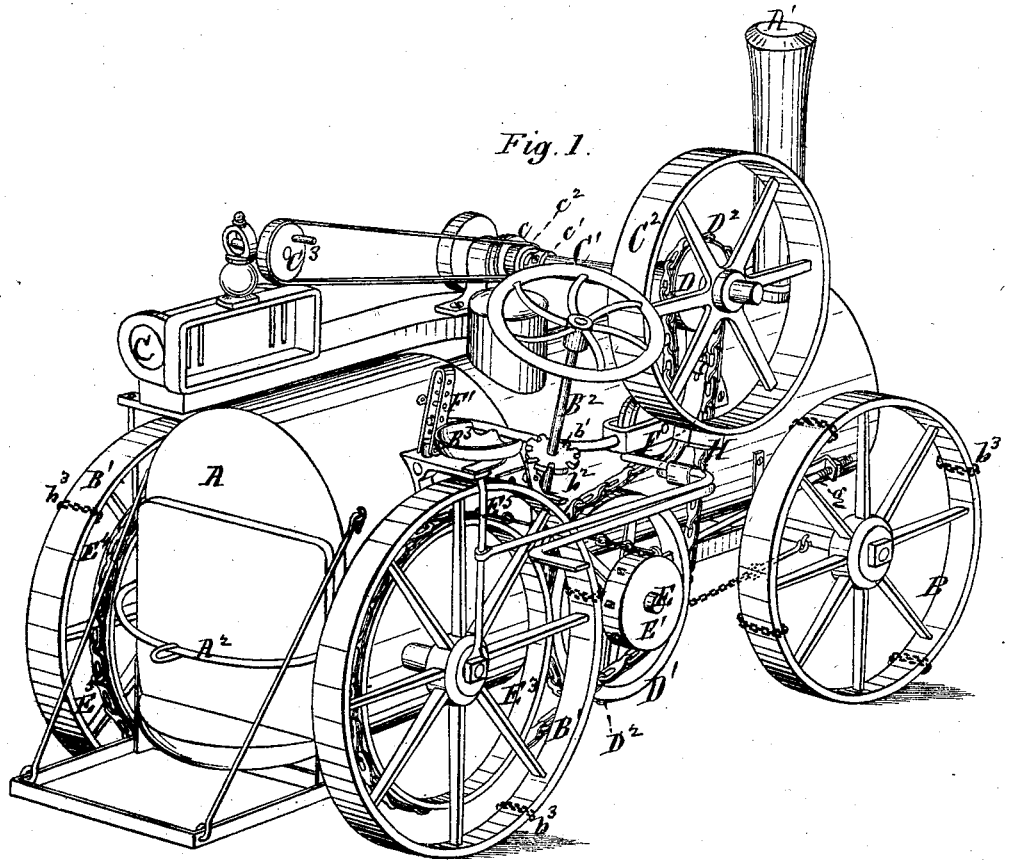
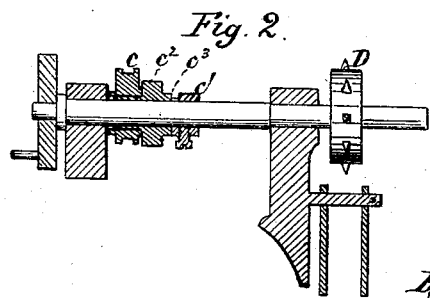
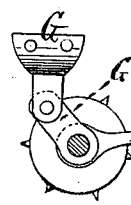
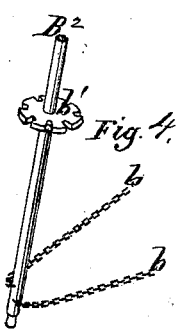
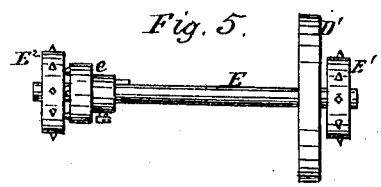
Witnesses
Aley Mahow
N B Smith
Inventor
Dan W. Kellogg
by A. M. Smith
Attorney
AM. PHOTO-LITHOGRAPHIC CO. N.Y. (OSBORNE'S PROCESS.)

UNITED STATES PATENT OFFICE.

DAN. W. KELLOGG, OF BATTLE CREEK, MICHIGAN.

IMPROVEMENT IN TRACTION OR PORTABLE ENGINES.

Specification forming part of Letters Patent No. 135,128, dated January 21, 1873.

*To all whom it may concern:*

Be it known that I, DAN. W. KELLOGG, of Battle Creek, county of Calhoun, State of Michigan, have invented a new and useful Improvement in Steam-Engines for Agricultural Purposes, of which the following is a full, clear, and exact description, reference being had to the accompanying drawing making part of this specification, in which—

Figure 1 is a perspective view of my improved engine. Fig. 2 represents the main shaft, crank-wheel, and eccentric, and operating devices; and Figs. 3, 4, and 5 are detached views of some of the mechanism for propelling and guiding the engine when it is employed on the road.

Similar letters of reference denote corresponding parts in all the figures.

The first part of my invention relates to a novel construction of the clutch devices by means of which the valve eccentric is operated. The second part of the invention consists in connecting one of the traction or driving wheels with its driving-shaft by means of a clutch, or its equivalent, in order that when the engine is moving around a curve I can detach one wheel, driving by the other only, thus avoiding the slipping of one wheel and the consequent strain of the parts. The third part of the invention relates to the construction of the devices for hanging the intermediate shaft and for imparting the desired tension to the chains of the driving-wheels. The invention further consists in certain details of construction, which will be fully set forth.

In the drawing, A is the boiler, $A^1$ the smoke-stack, and $A^2$ a draft bail or loop; B $B^1$, the wheels, $B^1$ being the rear and driving wheels, the front axle being mounted on a king-bolt, and turned in either direction by means of a chain, $b$, at or near each end, the chain being connected to a vertical or nearly vertical shaft, $B^2$, arranged within convenient reach of the driver while riding in seat $B^3$. This shaft is provided with a hand-wheel and with a notched wheel, $b^1$, and locking foot-latch $b^2$, (see Fig. 4,) by means of which the operator can readily guide the machine. $b^3$ are chains wrapped around the rims of the driving-wheels to increase the traction.

I am aware that ribs or corrugations have been employed upon the tread of wheels to increase their traction; but I regard these chains as being preferable, because I can remove them when the road is in suitable condition, and leaving the face of the wheels smooth, and thus avoiding the jarring consequent upon the use of the ribs.

C is the steam-cylinder, $C^1$ is the main shaft, and $C^2$ the band and fly wheel, these parts being of any usual or desired construction. $c$ is the eccentric mounted loosely on the main shaft. $c^1$ is a collar adjustably secured to the main shaft by means of a set-screw. $c^2$ is a band-wheel cast in one piece with or attached rigidly to eccentric $c$. $c^3$ is a sleeve projecting from band-wheel $c^2$. This sleeve $c^2$ does not form a complete circle, and does not, therefore, entirely surround shaft $C^1$. In fact, in practice, it does not occupy more than about thirty degrees, forming a shoulder-coupling. Collar $c^1$ is provided with a similar shoulder of about the same size, and the two are arranged on the shaft to overlap each other, and thus lock the eccentric $c$, band-wheel $c^2$, and collar $c^1$ together in a manner similar to the ordinary coupling employed for connecting wheels to the shafting, except that in my construction the eccentric can rotate independently of the collar within certain limits, for a purpose which will hereinafter be explained. $C^3$ is the band-wheel which drives the governor, and is connected with band-wheel $c^2$ by a belt in the usual manner.

The operation of the last-described device is as follows: The driver sets the valve by means of the governor-wheel $c^3$, so as to run the engine either backward or forward, as he may desire, regulating the amount of lead by the adjustable collar $c^1$, which drives the eccentric, and can reverse the engine by moving the eccentric around until shoulder or sleeve $c^3$ comes in contact with the opposite side of the shoulder on collar $c^1$. Of course the operator may adjust the eccentric by hand instead of employing the wheels $C^3$ and its driving-belt; but when he is in his seat $B^3$ this is the more convenient method.

D is a spurred wheel keyed to shaft $C^1$ and connected with a similar wheel, $D^1$, on shaft E by means of a driving-chain, $D^2$, as shown in the drawing. The shaft E is mounted in brackets bolted to the boiler, and has spurred wheels $E^1$ $E^2$ on each end. Motion is communicated from wheels $E^1$ $E^2$ to wheels $E^3$ $E^4$, which are attached to the rear wheels $B^1$ of the engine by means of driving-chains. Wheel $E^2$ is shown in Fig. 5, but cannot be seen in Fig. 1, being upon the opposite side of the engine. Of course, sprocket-wheels might be substituted for these spurred wheels; but those shown are believed to be preferable. It will, of course, be readily seen that motion can be communicated from the engine-shaft $C^1$ to the driving-wheels $B^1$, and the engine thus propelled. F is a forked lever, carrying a tightening-pulley, which engages with chain $D^2$. F' is a perforated standard, in which the free end of lever F is secured.

In order to place the engine more perfectly under the control of the driver when it is on the road, I arrange a brake, H, on a foot-lever within convenient reach, the brake acting upon the face of the band-wheel. I regard this as being the most effective point at which to apply a brake, as a small amount of friction is sufficient to check the movement of the engine. $e$ is a clutch-ring feathered to shaft E so as to slide thereon, being locked in any required position by a set-screw, $e'$. The spur on the clutch-ring $e$ is made to engage with spurred wheel $E^2$ when desired, thus locking said wheel to the shaft. I usually employ the parts under this arrangement when the engine is being propelled upon a straight road or up a grade; but when moving around curves I prefer to disengage the clutch from the wheel and drive by one only of the wheels.

In the drawing, the engine is represented in readiness for use upon the road as I employ it for hauling a thrashing-machine from place to place, and it will be readily understood that in order to drive the wheels $B^1$ the chains $E^5$ must be very tight. As shaft E is supported from the boiler, I have found it desirable to provide an additional bracing-support for the lower ends of the shaft-hangers, for the purpose of relieving the shell from undue strain. This I do by attaching a rod, $g$, to each end of the shaft, and securing the end of the rods to the boiler near its front end, as shown in Fig. 1, thus transferring nearly all of the strain to that portion of the boiler which is best able to sustain it, the shell of the boiler being strongly supported against deflection at this point by the head. The hangers G G' are jointed, as in Fig. 3, and the rods are provided with a screw-thread, as shown, so that I can take up any slack in chain $E^5$. When the engine is employed for driving a thrasher or other machinery, I release the tightening-lever F and remove the chain $D^2$ from spurred wheel D, and belt from band-wheel $C^2$, as with an ordinary portable or stationary engine.

I am aware that the valve motion in engines has been reversed by means of a movable cam or tappet driven by a clutch; hence I do not wish to claim such a combination broadly; but my device differs from those heretofore used. As I employ an eccentric and a sliding valve, there is no tendency to move the eccentric $c$ in a direction contrary to that in which it is being driven; therefore I can connect my clutch rigidly with the driving-shaft, and dispense with all lateral movement of either eccentric or clutch.

Having now described my invention, what I claim as new, and desire to secure by Letters Patent, is—

1. The combination of the crank-shaft $C^1$, the eccentric $c$ mounted loosely on said shaft, and the clutch or shouldered collar $c^1$ secured rigidly to the shaft, these parts being constructed and arranged to operate as set forth.

2. The combination of crank-shank $C^1$, loose eccentric $c$, clutch $c^1$, band-wheel $c^2$, governor-wheel $c^3$, and a connecting-belt, substantially as described.

3. In combination with the shaft E and its hangers, the supporting-rods $g$ attached to the front end of the boiler, to relieve the central portion of the boiler from undue strain, substantially as described.

4. The combination of the shaft E, jointed hangers G G', and adjustable rods $g$, substantially as described, and for the purpose set forth.

5. The combination of engine-shaft $C^1$, spurred wheel D, second shaft E, spurred wheel $D^1$ with the traction and supporting wheels $B^1$, spurred wheels $E^3$ $E^4$ and their connecting-chains, whereby the power of the engine may be applied either to propel the engine or to drive machinery, substantially as described.

6. The combination of the chains $b^3$ with the wheels, for the purpose of increasing the traction, substantially as described.

In testimony whereof I have hereunto set my hand this 23d day of July, A. D. 1872.

DAN. W. KELLOGG.

Witnesses:
  F. A. ALLWARDT,
  R. B. MERRITT.